(12) United States Patent  
Iwasaki

(10) Patent No.: US 9,609,302 B2  
(45) Date of Patent: Mar. 28, 2017

(54) IMAGE PROCESSING DEVICE, IMAGING DEVICE, IMAGE PROCESSING METHOD, AND RECORDING MEDIUM

(71) Applicant: FUJIFILM Corporation, Tokyo (JP)

(72) Inventor: Yoichi Iwasaki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 380 days.

(21) Appl. No.: 14/500,176

(22) Filed: Sep. 29, 2014

(65) Prior Publication Data

US 2015/0015672 A1    Jan. 15, 2015

Related U.S. Application Data

(63) Continuation of application No. PCT/JP2013/055374, filed on Feb. 28, 2013.

(30) Foreign Application Priority Data

Mar. 30, 2012 (JP) ................................ 2012-082079

(51) Int. Cl.
*H04N 13/02* (2006.01)
*H04N 13/00* (2006.01)
*H04N 5/232* (2006.01)

(52) U.S. Cl.
CPC ..... *H04N 13/0018* (2013.01); *H04N 5/23229* (2013.01); *H04N 5/23245* (2013.01);
(Continued)

(58) Field of Classification Search
CPC .......... H04N 13/0018; H04N 13/0007; H04N 13/0022; H04N 13/0217; H04N 13/0285;
(Continued)

(56) References Cited

U.S. PATENT DOCUMENTS 5,914,770 A * 6/1999 Bergner ............... G02B 27/017  
                                                                                    351/206  
2011/0018969 A1    1/2011  Tanaka  
(Continued)

FOREIGN PATENT DOCUMENTS

JP      2011-29700 A      2/2011  
JP      2011-199502 A    10/2011  
(Continued)

OTHER PUBLICATIONS

International Search Report, mailed May 7, 2013, issued in PCT/2013/055374.

(Continued)

*Primary Examiner* — Allen Wong  
(74) *Attorney, Agent, or Firm* — Birch, Stewart, Kolasch & Birch, LLP

(57) ABSTRACT

An image processing method according to the present invention cuts out partial images corresponding to trimming regions, which is specified for multiple viewpoint images of a stereoscopic image obtained by pupil-division-scheme imaging, from the respective viewpoint images, generates a stereoscopic partial image including multiple partial images, generates parallax information that indicates the parallax between the partial images, adjusts the parallax between the partial images based on the parallax information, and then, for the partial images after the parallax adjustment, enhances the sharpness as the adjusted parallax amount decreases and reduces the sharpness as the adjusted parallax amount increases.

17 Claims, 18 Drawing Sheets

(52) U.S. Cl.
CPC ..... *H04N 13/0007* (2013.01); *H04N 13/0022* (2013.01); *H04N 13/0217* (2013.01); *H04N 13/0285* (2013.01); *H04N 13/0296* (2013.01); *H04N 2013/0074* (2013.01)

(58) Field of Classification Search
CPC ........... H04N 13/0296; H04N 5/23245; H04N 5/23229; H04N 2013/0074
USPC .......................................................... 348/46
See application file for complete search history.

(56) References Cited

U.S. PATENT DOCUMENTS

| | | | |
|---|---|---|---|
| 2011/0069156 A1* | 3/2011 | Kurahashi | G06K 9/00255 348/47 |
| 2011/0292045 A1 | 12/2011 | Nakamura et al. | |
| 2012/0139900 A1 | 6/2012 | Matsui | |
| 2013/0010078 A1 | 1/2013 | Aoki | |
| 2013/0010084 A1* | 1/2013 | Hatano | G03B 35/08 348/47 |

FOREIGN PATENT DOCUMENTS

| | | |
|---|---|---|
| JP | 2011-211717 A | 10/2011 |
| WO | WO 2011/024352 A1 | 3/2011 |
| WO | WO 2011/118089 A1 | 9/2011 |

OTHER PUBLICATIONS

Written Opinion of the International Searching Authority, mailed May 7, 2013, issued in PCT/JP2013/055374.

* cited by examiner (MAIN-PIXEL)

(SUB-PIXEL)

IMAGE PROCESSING DEVICE, IMAGING DEVICE, IMAGE PROCESSING METHOD, AND RECORDING MEDIUM

CROSS-REFERENCE TO RELATED APPLICATIONS

This application is a Continuation of PCT International Application No. PCT/JP2013/055374 filed on Feb. 28, 2013, which claims priority under 35 U.S.C §119(a) to Japanese Patent Application No. 2012-82079 filed on Mar. 30, 2012. Each of the above application(s) is hereby expressly incorporated by reference, in its entirety, into the present application.

BACKGROUND OF THE INVENTION

Field of the Invention

The present invention relates to an image processing device, an imaging device, an image processing method, a recording medium, and a program that, in the case of trimming a stereoscopic image generated by pupil-division-scheme imaging, can avoid impairing the stereoscopic effect of a stereoscopic partial image cut out from the trimming region of the stereoscopic image.

Description of the Related Art

A display device that shows multiple viewpoint images having a parallax, simultaneously to the left and right eyes of an observer, respectively, and thereby, allows for stereo-vision of the multiple viewpoint images to the observer is known.

PTL 1 (Japanese Patent Application Laid-Open No. 2011-29700) discloses a configuration in which, when multiple viewpoint images are trimmed and displayed, a parallax adjustment amount input by a user is corrected based on a digital zoom factor, and thereby, a digital zoom can be performed with an appropriate stereoscopic effect kept.

PTL 2 (Japanese Patent Application Laid-Open No. 2011-199502) discloses a configuration in which the F-value of a diaphragm is controlled such that the parallax for left and right images is in a predetermined range, based on the distance information of a subject or the parallax amount for the subject, and thereby, a natural left image and right image to put no burden on the eyes are acquired.

PTL 3 (Japanese Patent Application Laid-Open No. 2011-211717) discloses a configuration in which parallax amounts generated in the foreground and the background are weighted and adjusted (strength and weakness are added) depending on the parallax amounts, based on the parallax amount at a feature point of the viewpoint image, and thereby, a parallax image with a desirable stereoscopic effect can be displayed, particularly, on a stereoscopic display print.

SUMMARY OF THE INVENTION

However, there is a problem in that, when a stereoscopic image is trimmed in an arbitrary range that is specified and input by a user, the stereoscopic effect is remarkably impaired if the trimming range is narrow. Particularly, in the trimming of a stereoscopic image generated by pupil-division-scheme imaging, a wholly blurred image is sometimes produced so that the stereoscopic effect is further impaired.

The present invention, which has been made in view of such circumstances, has an object to provide an image processing device, an imaging device, an image processing method, a recording medium and a program that, in the case of trimming a stereoscopic image generated by pupil-division-scheme imaging, can avoid impairing the stereoscopic effect of a partial image cut out from the trimming region of the stereoscopic image.

For achieving the above object, the present invention provides an image processing device including: an image acquisition device for acquiring a stereoscopic image including multiple viewpoint images that are generated by pupil-division-scheme imaging and that are different in viewpoint; an instruction input device for inputting an instruction that indicates trimming regions, the trimming regions being cut out from the multiple viewpoint images of the stereoscopic image; a trimming device for cutting out partial images corresponding to the trimming regions, from the multiple viewpoint images of the stereoscopic image, respectively, and thereby generating a stereoscopic partial image including the multiple partial images that are different in viewpoint; a parallax information generation device for generating parallax information that indicates a parallax between partial images for the multiple partial images; a parallax adjustment device for adjusting the parallax between partial images for the multiple partial images, based on the parallax information; and a sharpness alternation processing device for performing an image process for the multiple partial images after the adjustment of the parallax, based on the adjustment result by the parallax adjustment device, the image process being a process to enhance sharpness as the adjusted parallax amount decreases and to reduce the sharpness as the adjusted parallax amount increases.

According to the present invention, in the trimming of the stereoscopic image including the multiple viewpoint images that are generated by the pupil-division-scheme imaging and that are different in viewpoint, the parallax information for the trimming regions (the multiple partial images that are different in viewpoint) in the multiple viewpoint images is generated. Then, the parallax between partial images for the multiple partial images is adjusted based on the parallax information, and the sharpness of the multiple partial images is altered based on the adjustment result of the parallax. Therefore, even when a region that is blurred due to the pupil-division-scheme imaging is cut out, it is possible to obtain a stereoscopic partial image in which the sharpness is appropriately altered and the stereoscopic effect is not impaired.

An aspect includes a cross-point setting device for setting a cross-point having no parallax, in the stereoscopic partial image. Thereby, even when the region of a subject image at a shorter distance than the cross-point is cut out, or when the region of a subject image at a longer distance than the cross-point is cut out, it is possible to obtain a stereoscopic partial image with an appropriate parallax.

In an aspect, the cross-point setting device sets the cross-point to a point at which an average parallax for the stereoscopic partial image and an average parallax for the stereoscopic image coincide. It is possible to obtain a stereoscopic partial image in which an appropriate cross-point is automatically set. Here, the "coincidence" of the average parallaxes includes a "roughly coincident state".

In an aspect, the sharpness alternation processing device segments the stereoscopic partial image into a first region and a second region having a larger parallax amount than the first region, based on the parallax information after the parallax adjustment, and then, enhances the sharpness of the first region and reduces the sharpness of the second region having the larger parallax amount than the first region. Thereby, when the stereoscopic display of the stereoscopic partial image is performed, for a subject image in a region with a small parallax amount, the sharpness is enhanced, and for a subject image in a region with a large parallax amount, the sharpness is reduced. Therefore, it is possible to keep the stereoscopic effect in the region with a small parallax amount, and to make a double image inconspicuous in the region with a large parallax amount.

In an aspect, the sharpness alternation processing device alters the sharpness of the stereoscopic partial image, using a blur function that expresses a blur state of the multiple viewpoint images, the blur state being caused by the pupil-division-scheme imaging. Thereby, it is possible to appropriately alter the sharpness of the stereoscopic partial image, depending on the blur distribution.

In an aspect, the sharpness alternation processing device alters the sharpness of a whole of the stereoscopic partial image.

In an aspect, when performing a process to increase the parallax between the partial images, the parallax adjustment device detects, within the stereoscopic partial image, a region in a shorter distance than a cross-point having no parallax and a region in a longer distance than the cross-point, based on the parallax information, and makes a parallax increasing rate for the region in the shorter distance greater than a parallax increasing rate for the region in the longer distance. Thereby, since the parallax amount for a subject image in the region at the short distance is increased greater than the parallax amount for a subject image in the region at the long distance, an observer can experience the stereoscopic effect more easily.

An aspect includes an image enlargement device for enlarging a size of the stereoscopic partial image, in which, when performing a process to increase the parallax between the partial images, the parallax adjustment device subtracts an incremental parallax amount associated with the enlargement of the size of the stereoscopic partial image by the image enlargement device, to determine an increasing rate of the parallax for the stereoscopic partial image.

Further, the present invention provides an imaging device including the above image processing device and an imaging device for performing imaging by a pupil-division scheme.

Further, the present invention provides an image processing method including: a step of acquiring a stereoscopic image including multiple viewpoint images that are generated by pupil-division-scheme imaging and that are different in viewpoint; a step of inputting an instruction that indicates trimming regions, the trimming regions being cut out from the multiple viewpoint images of the stereoscopic image; a step of cutting out partial images corresponding to the trimming regions, from the multiple viewpoint images of the stereoscopic image, respectively, and thereby generating a stereoscopic partial image including the multiple partial images that are different in viewpoint; a step of generating parallax information that indicates a parallax between partial images for the multiple partial images; a step of adjusting the parallax between partial images for the multiple partial images, based on the parallax information; and a step of performing an image process for the multiple partial images after the adjustment of the parallax, based on the adjustment result of the parallax, the image process being a process to enhance sharpness as the adjusted parallax amount decreases and to reduce the sharpness as the adjusted parallax amount increases.

Further, the present invention provides a computer-readable recording medium, in which, when a command stored in the recording medium is read by a processor, the processor executes: a step of acquiring a stereoscopic image including multiple viewpoint images that are generated by pupil-division-scheme imaging and that are different in viewpoint; a step of inputting an instruction that indicates trimming regions, the trimming regions being cut out from the multiple viewpoint images of the stereoscopic image; a step of cutting out partial images corresponding to the trimming regions, from the multiple viewpoint images of the stereoscopic image, respectively, and thereby generating a stereoscopic partial image including the multiple partial images that are different in viewpoint; a step of generating parallax information that indicates a parallax between partial images for the multiple partial images; a step of adjusting the parallax between partial images for the multiple partial images, based on the parallax information; and a step of performing an image process for the multiple partial images after the adjustment of the parallax, based on the adjustment result of the parallax, the image process being a process to enhance sharpness as the adjusted parallax amount decreases and to reduce the sharpness as the adjusted parallax amount increases.

Further, the present invention provides a program to make a computer execute: a step of acquiring a stereoscopic image including multiple viewpoint images that are generated by pupil-division-scheme imaging and that are different in viewpoint; a step of inputting an instruction that indicates trimming regions, the trimming regions being cut out from the multiple viewpoint images of the stereoscopic image; a step of cutting out partial images corresponding to the trimming regions, from the multiple viewpoint images of the stereoscopic image, respectively, and thereby generating a stereoscopic partial image including the multiple partial images that are different in viewpoint; a step of generating parallax information that indicates a parallax between partial images for the multiple partial images; a step of adjusting the parallax between partial images for the multiple partial images, based on the parallax information; and a step of performing an image process for the multiple partial images after the adjustment of the parallax, based on the adjustment result of the parallax, the image process being a process to enhance sharpness as the adjusted parallax amount decreases and to reduce the sharpness as the adjusted parallax amount increases.

According to the present invention, in the case of trimming a stereoscopic image generated by pupil-division-scheme imaging, it is possible to avoid impairing the stereoscopic effect of a stereoscopic partial image cut out from the trimming region of the stereoscopic image.

DETAILED DESCRIPTION OF THE PREFERRED EMBODIMENTS

Hereinafter, embodiments of the present invention are explained in detail, with reference to the accompanying drawings.

Embodiments of an image processing device, an image processing method, a stereoscopic imaging device and a portable electronic apparatus according to the present invention are explained below, with reference to the accompanying drawings.

<Overall Configuration of Stereoscopic Imaging Device>

Figure 1:
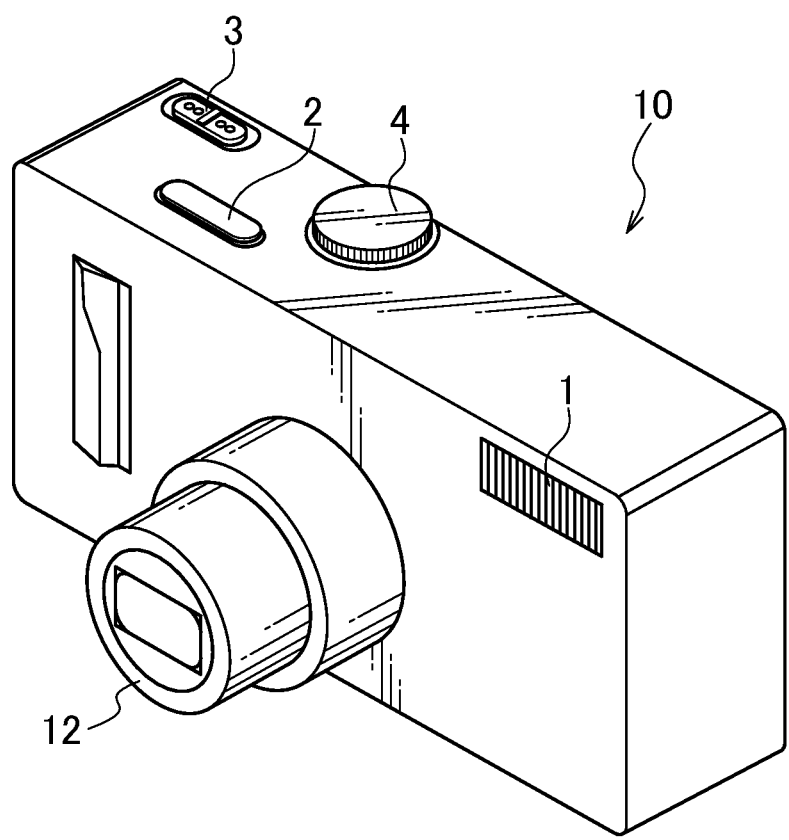
FIG. 1 is a front perspective view showing an embodiment of a 3D digital camera to which an image processing device according to the present invention is applied.
Figure 2:
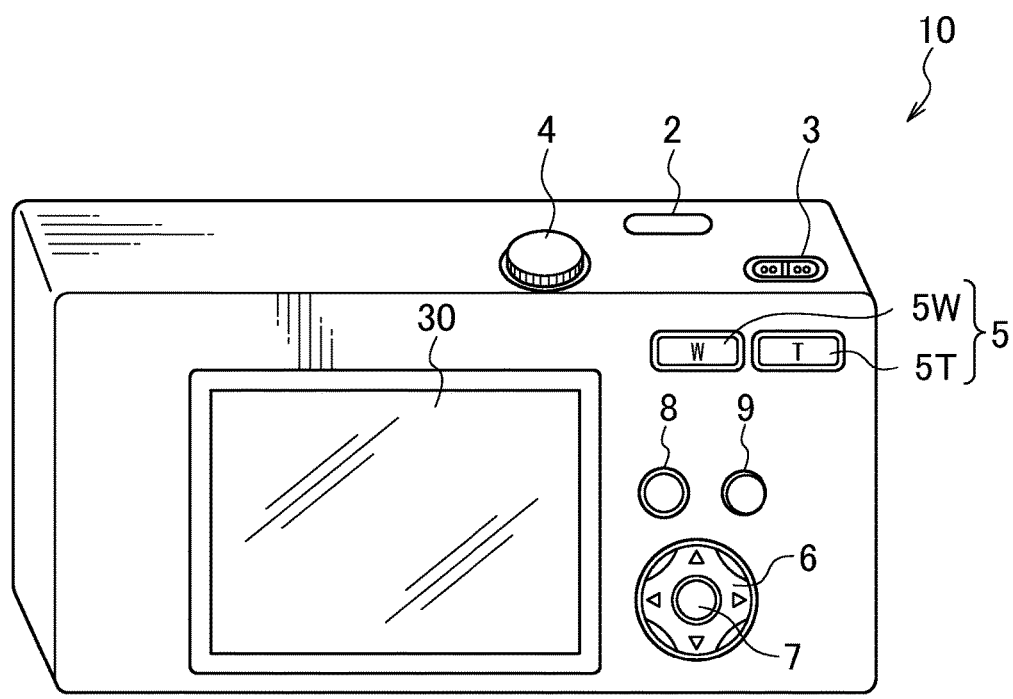
FIG. 2 is a back view of the above 3D digital camera.

FIG. 1 is a front perspective view showing an embodiment of a 3D digital camera (stereoscopic imaging device) to which an image processing device according to the present invention is applied. FIG. 2 is a back view of the above 3D digital camera. This 3D digital camera 10 is a digital camera that receives, with an imaging element, the light having passed through a lens, converts it into a digital signal, and then records it in a recording medium such as a memory card.

As shown in FIG. 1, in the 3D digital camera 10, an image-taking lens 12, a flash 1 and the like are provided on the front surface, and a shutter button 2, a power/mode switch 3, a mode dial 4 and the like are provided on the top surface. On the other hand, as shown in FIG. 2, a 3D liquid crystal monitor 30 for 3D display, a zoom button 5, a cross button 6, a MENU/OK button 7, a playback button 8, a BACK button 9 and the like are provided on the back surface of the camera.

The image-taking lens 12, which is constituted by a collapsible zoom lens, extends from the camera body, when the mode of the camera is set to an image-taking mode by the power/mode switch 3. The flash 1 emits flash light toward a main subject.

The shutter button 2 is configured as a two-step stroke type switch that allows for a so-called "half-push" and "full-push". When the 3D digital camera 10 is driven as the image-taking mode, the AE/AF (automatic exposure adjustment/automatic focusing) is activated by performing the "half-push" of the shutter button 2, and an image taking is executed by performing the "full-push". Further, when the 3D digital camera 10 is driven as the image-taking mode, an image taking is executed by performing the "full-push" of the shutter button 2.

The power/mode switch 3 has both of a function as a power switch for performing the ON/OFF of the power of the 3D digital camera 10 and a function as a mode switch for setting the mode of the 3D digital camera 10. The power/mode switch 3 is provided so as to be able to slide among an "OFF position", a "playback position" and an "image-taking position". In the 3D digital camera 10, when the power/mode switch 3 is slid and placed to the "playback position" or the "image-taking position", the power is turned on, and when it is placed to the "OFF position", the power is turned off. Then, when the power/mode switch 3 is slid and placed to the "playback position", the "playback mode" is set, and when it is placed to the "image-taking position", the "image-taking mode" is set.

The mode dial 4 functions as an image-taking mode setting device for setting the image-taking mode of the 3D digital camera 10. Depending on the setting position of this mode dial, the image-taking mode of the 3D digital camera 10 is set to various modes. For example, there are a "plane image taking mode" for taking a plane image, a "stereoscopic image taking mode" for taking a stereoscopic image (3D image), a "moving image taking mode" for taking a moving image, and the like.

The 3D liquid crystal monitor 30 is a stereoscopic display device that can display a stereoscopic image (a left-eye image and a right-eye image) with a parallax barrier, as oriented images having predetermined orientations respectively. When a stereoscopic image is input to the 3D liquid crystal monitor 30, a parallax barrier having a pattern in which light transmitting parts and light blocking parts are alternately arrayed at a predetermined pitch is generated on a parallax barrier display layer of the 3D liquid crystal monitor 30, and strip-shaped image fragments showing the left and right pictures are alternately arranged and displayed on an image display surface of the lower layer. In the case of being utilized as a display panel for a plane image or a user interface, nothing is displayed on the parallax barrier display layer, and a single piece of image is displayed with no change on the image display surface of the lower layer.

Here, the form of the 3D liquid crystal monitor 30 is not limited to this, and it only needs to display a left-eye image and a right-eye image such that they can be recognized as a stereoscopic image. For example, the form of the 3D liquid crystal monitor 30 may be a form in which a lenticular lens is used, or a form in which a user can view the left-eye image and the right-eye image individually, by putting dedicated glasses such as polarization glasses or liquid-crystal shutter glasses.

The zoom button 5 functions as a zoom instruction device for giving an instruction of the zoom, and includes a tele-button 5T for giving an instruction of the telescopic-side zoom and a wide-button 5W for giving an instruction of the wide-side zoom. In the 3D digital camera 10, when the tele-button 5T and the wide-button 5W are operated in the image-taking mode, the focal length of the image-taking lens 12 is changed. Further, when the tele-button 5T and the wide-button 5W are operated in the playback mode, the playing image is magnified or demagnified.

The cross button 6 is an operation unit for inputting instructions for four directions: the upward direction, the downward direction, the leftward direction and the rightward direction, and functions as a button (cursor-movement operation device) for selecting an item from a menu screen, or for giving instructions of selections of various setting items from each menu. The left/right key functions as a frame advance (forward directional/backward directional advance) button in the playback mode.

The MENU/OK button 7 is an operation key having both of a function as a menu button for commanding the display of a menu on the screen of the 3D liquid crystal monitor 30 and a function as an OK button for commanding the decision and execution of the selected content, or the like.

The playback button 8 is a button for the switching to the playback mode, in which a still image or moving image of a taken and recorded stereoscopic image (3D image) or plane image (2D image) is displayed on the 3D liquid crystal monitor 30.

The BACK button 9 functions as a button for giving an instruction of the cancel of an input operation or the restoration to the last operation state.

<Configuration Example of Image-Taking Optical System and Imaging Element>

Figure 5:
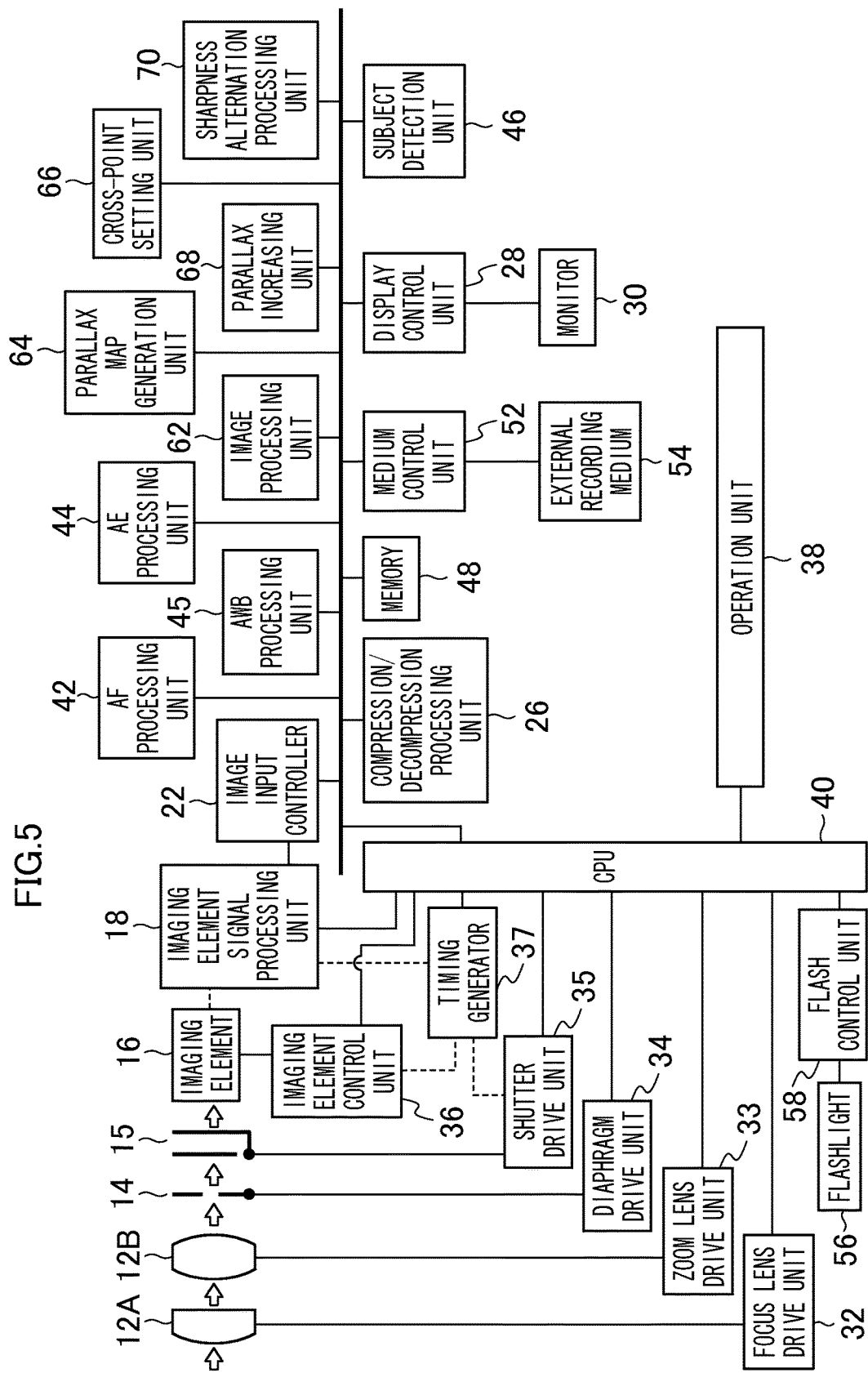
FIG. 5 is a block diagram showing an embodiment of the internal configuration of the above 3D digital camera.

As shown in FIG. 5, a focus lens 12A and a zoom lens 12B constitute an image-taking optical system (the image-taking lens 12), which is constituted by many lenses. A diaphragm 14 includes, for example, five diaphragm blades, and the diaphragm control of the diaphragm value (F-value) is performed in a continuous or stepwise manner, for example, from F2 to F8. A mechanical shutter 15, which is driven by a shutter drive unit 35, switches between the blocking and non-blocking of the light to enter an imaging element 16. In the image-taking mode, the image light showing a subject forms an image on the light receiving surface of the imaging element 16, through the image-taking lens 12 and the diaphragm 14.

Figure 3A:
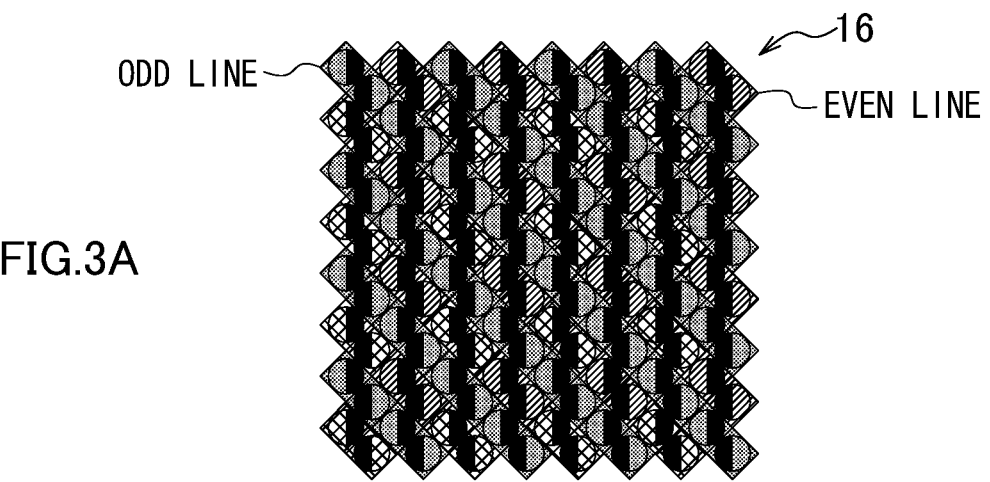
FIG. 3A is a diagram showing a configuration example of an imaging element of the above 3D digital camera.
Figure 3B:
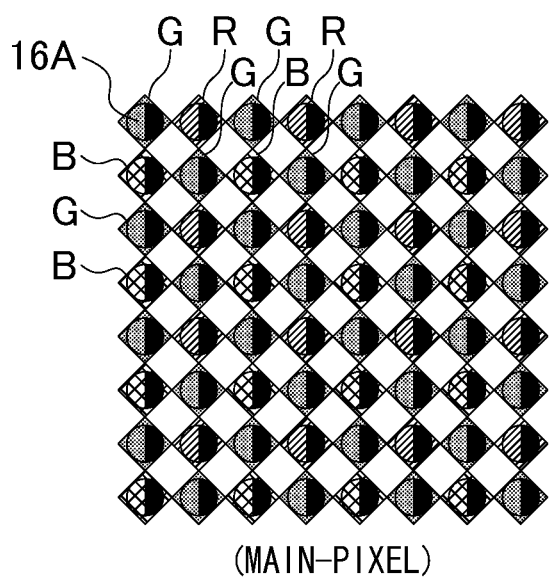
FIG. 3B is a diagram showing the configuration example of the imaging element of the above 3D digital camera (main-pixel).
Figure 3C:
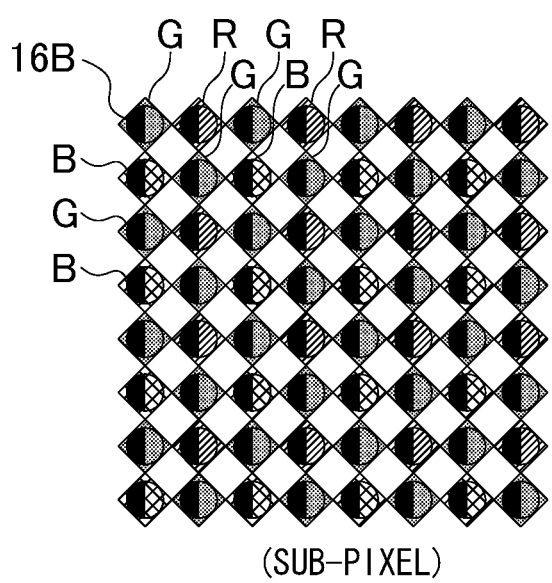
FIG. 3C is a diagram showing the configuration example of the imaging element of the above 3D digital camera (sub-pixel).

FIG. 3A to FIG. 3C are diagrams showing a configuration example of the imaging element 16.

The imaging element 16 is configured as a CCD (Charge Coupled Device) image sensor for detection of images (multiple viewpoint images) having a parallax, and has pixels on odd lines (main-pixels, called A-plane pixels, also) and pixels on even lines (sub-pixels, called B-plane pixels, also), each of which are arranged in a matrix. Two-plane image signals into which the main-pixels and sub-pixels are photoelectrically converted respectively can be independently read.

As shown in FIG. 3A to FIG. 3C, on the odd lines (1, 3, 5, . . . ) of the imaging element 16, of pixels including color filters of R (red), G (green) and B (blue), a line of a pixel arrangement of GRGR . . . and a line of a pixel arrangement of BGBG . . . are alternately provided. On the other hand, as for the pixels on the even lines (2, 4, 6, . . . ), similarly to the odd lines, a line of a pixel arrangement of GRGR . . . and a line of a pixel arrangement of BGBG . . . are alternately provided, and the respective pixels are disposed so as to be deviated in the line direction by one-half pitch relative to the pixels on the even lines.

Figure 4A:
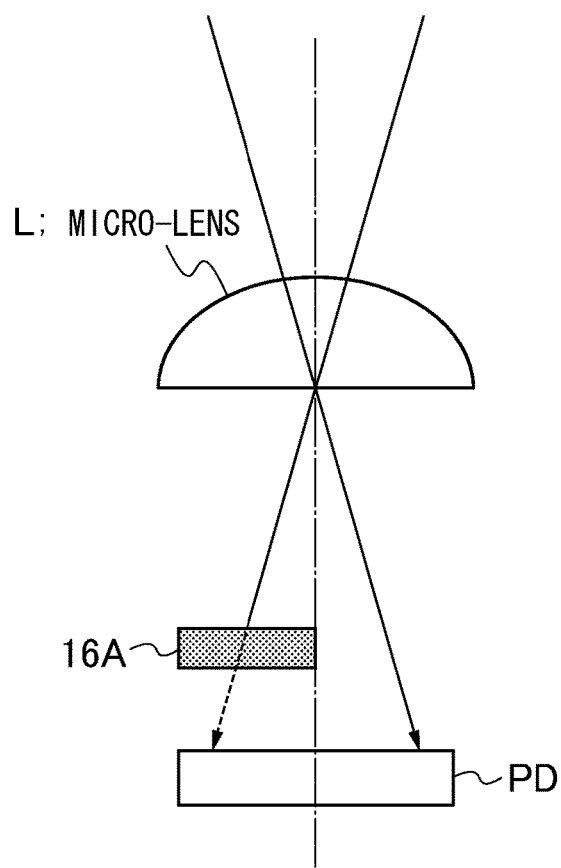
FIG. 4A is an enlarged view of a principal part of the above imaging element.
Figure 4B:
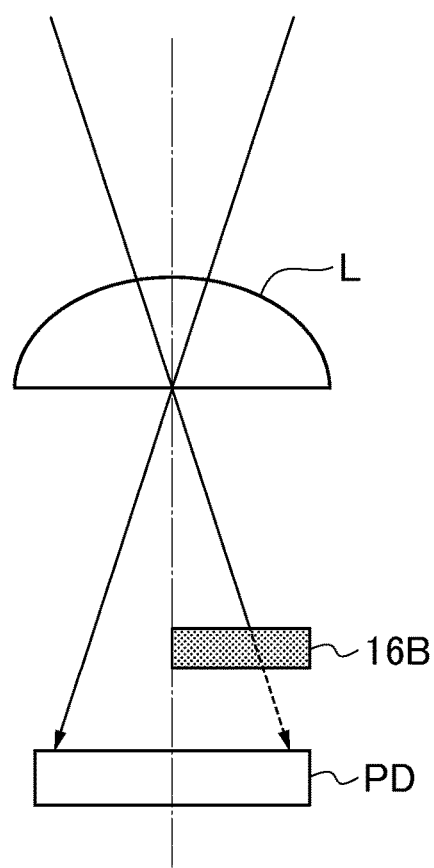
FIG. 4B is an enlarged view of a principal part of the above imaging element.

FIG. 4A and FIG. 4B are enlarged views of principal parts of the imaging element 16 that functions as a phase-difference image sensor.

As shown in FIG. 4A, a light blocking member 16A is provided at the front surface side (the micro-lens L side) to a photodiode PD of the main-pixel of the imaging element 16. On the other hand, as shown in FIG. 4B, a light blocking member 16B is provided at the front surface side to a photodiode PD of the sub-pixel. The micro-lenses L and the light blocking members 16A, 16B have a function as a pupil-division device, and as shown in FIG. 4A, the light blocking member 16A performs the light blocking for the left half of the light receiving surface of the main-pixel (photodiode PD). Therefore, the main-pixel receives only the left side to the optical axis of the light flux passing through the exit pupil of the image-taking lens 12. Further, as shown in FIG. 4B, the light blocking member 16B performs the light blocking for the right half of the light receiving surface of the sub-pixel (photodiode PD). Therefore, the sub-pixel receives only the right side to the optical axis of the light flux passing through the exit pupil of the image-taking lens 12. Thus, by the micro-lenses L and the light blocking members 16A, 16B as the pupil-division device, the light flux passing through the exit pupil is divided into left and right, and they enter the main-pixel and the sub-pixel, respectively.

Further, in a subject image corresponding to the left-half light flux of the light flux passing through the exit pupil of the image-taking lens 12 and a subject image corresponding to the right-half light flux, the focus parts are image-formed at the same position on the imaging element 16, but front-focus or rear-focus parts enter different positions on the imaging element 16 from each other (the phases are deviated). Thereby, the subject image corresponding to the left-half light flux and the subject image corresponding to the right-half light flux can be acquired as parallax images (a left-eye image and a right-eye image) that are different in parallax. Here, the imaging element 16 according to the embodiment is a CCD image sensor, but is not limited to this. The imaging element 16 may be a CMOS (Complementary Metal Oxide Semiconductor) type image sensor, for example.

<Internal Configuration of Stereoscopic Imaging Device>

FIG. 5 is a block diagram showing an embodiment of the internal configuration of the above 3D digital camera 10. The 3D digital camera 10 records a picked-up image in an external recording medium 54, and the operation of the whole device is integrally controlled by a central processing unit (CPU) 40.

The 3D digital camera 10 is provided with an operation unit 38 including the shutter button 2, the mode dial 4, the playback button 8, the MENU/OK button 7, the cross button 6, the zoom button 5 and the BACK button 9. A signal from the operation unit 38 is input to the CPU 40. Based on the input signal, the CPU 40 controls each circuit of the 3D digital camera 10, and performs for example, the lens drive control, the diaphragm drive control, the image-taking operation control, the image processing control, the recording/playing control of image data, the display control of the 3D liquid crystal monitor 30, and the like. The operation unit 38 receives an input of an instruction indicating trimming regions that are cut out from multiple viewpoint images composing a stereoscopic image.

When the power of the 3D digital camera 10 is turned on by the power/mode switch 3, a power unit, which is not shown in the figure, supplies electricity to each block, and the drive of the 3D digital camera 10 starts.

The light flux having passed through the focus lens 12A, the zoom lens 12B, the diaphragm 14 and the like forms an image on the imaging element 16, and signal charges are accumulated in the imaging element 16. The signal charges accumulated in the imaging element 16 are read as a voltage signal corresponding to the signal charges, in accordance with the control by an imaging element control unit 36 based on a reading signal to be given from a timing generator 37. The voltage signal read from the imaging element 16 is given to an imaging element signal processing unit 18.

The imaging element signal processing unit 18 performs various signal processes to the voltage signal output from the imaging element 16, and outputs it to an image input controller 22. Here, in the example, an A/D converter is built in the imaging element 16.

To the digital image signal, the imaging element signal processing unit 18 performs predetermined signal processes such as an offset process, a white balance correction, a gain control process including a sensitivity correction, a gamma correction process, a demosaic process (synchronization process), a YC process and an edge enhancement process.

Here, the main-image data read from the main-pixels on the odd lines of the imaging element 16 are processed as left-eye image data, and the sub-image data read from the sub-pixels on the even lines are processed as right-eye image data.

The left-eye image data and right-eye image data (the 3D image data) processed by the imaging element signal processing unit 18 are input to a memory 48 through the image input controller 22.

The 3D image data read from the memory 48 are encoded in a display control unit 28, and then, are output to the monitor 30 (3D liquid crystal display device) provided on the back surface of the camera. Thereby, 3D subject images are continuously displayed on the display screen of the monitor 30.

When the first-step push (half-push) of the shutter button 2 of the operation unit 38 is performed, the CPU 40 starts the AF operation and the AE operation, moves the focus lens 12A in the optical axis direction through the focus lens drive unit 32, and performs such a control that the focus lens 12A comes to the focusing position.

An AF processing unit 42 is a part for performing a contrast AF process or a phase-difference AF process. In the case of performing the contrast AF process, for at least one image of the left-eye image and the right-eye image, high frequency components of the image in a predetermined focus region are extracted, and an AF evaluation value indicating a focusing state is calculated by integrating the high frequency components. The focus lens 12A is controlled such that the AF evaluation value is maximized, and thereby, the AF control is performed. Further, in the case of performing the phase-difference AF process, the phase difference of images corresponding to the main-pixels and sub-pixels in predetermined focus regions of the left-eye image and right-eye image is detected, and a defocus amount is determined based on the information indicating the phase difference. The focus lens 12A is controlled such that the defocus amount is zero, and thereby, the AF control is performed.

In response to a zoom command from the zoom button 5, the CPU 40 advances or retreats the zoom lens 12B in the optical axis direction through a zoom lens drive unit 33, and alters the focal length.

Further, at the time of the half-push of the shutter button 2, the image data output from the imaging element signal processing unit 18 are taken in an AE processing unit 44.

The AE processing unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the subject, from the integrated value input by the AE processing unit 44, and based on the image-taking Ev value, determines the F-value of the diaphragm 14 to be set to the diaphragm drive unit 34, and the electronic shutter (shutter speed) of the imaging element 16 to be set to the timing generator 37, in accordance with a predetermined program chart.

An AWB processing unit 45 analyzes the image, and performs the white balance process to the image.

Here, in FIG. 5, a subject detection unit 46 is a known subject detection circuit for detecting a particular subject (for example, a face image) in an image-taking angular field and setting an area containing the subject as an AF area and an AE area (for example, Japanese Patent Application Laid-Open No. 9-101579, for example).

Further, the memory 48 includes a ROM (Read-Only Memory) (EEPROM (Electrically Erasable Programmable Read-Only Memory)) in which an image processing program for correcting the stereoscopic effect (correcting the parallax) of the left-eye image and right-eye image according to the present invention, a calculation formula or look-up table for calculating a filter coefficient, parameters of a calculation formula corresponding to the degrees of parallaxes or parallax enhancements, or the information for determining a look-up table is stored in addition to a camera control program, the defect information of the imaging element 16, and various parameters or tables to be used for image processes and the like. Here, the detail of the image processing program according to the present invention and the like is described later.

When the AE operation and AF operation by the half-push of the shutter button 2 is finished and the second-step push (full-push) of the shutter button 2 is performed, in response to the push, two pieces of image data of a left viewpoint image (main-image) and a right viewpoint image (sub-image) that correspond to the main-pixels and the sub-pixels and that are output from the imaging element 16 are input from the image input controller 22 to the memory 48, and are temporarily stored.

The two pieces of image data temporarily stored in the memory 48 are appropriately read by the imaging element signal processing unit 18, and here, predetermined signal processes including the demosaic process (synchronization process; a process of performing the interpolation for spatial deviations of color signals associated with the arrangement of primary color filters and converting color signals into a synchronous system), image processes of the parallax correction and edge enhancement according to the present invention, and a YC process (a generation process of luminance data and color difference data of the image data) are performed. The image data (YC data) after the YC process are stored in the memory 48, again.

The two pieces of YC data stored in the memory 48 are each output to a compression/decompression processing unit 26, and, after the execution of a predetermined compression process such as JPEG (Joint Photographic Experts Group), are stored in the memory 48, again. From the two pieces of YC data (compressed data) stored in the memory 48, a multi-picture file (MP file: a file in a format in which multiple images are linked) is generated. The MP file is read by a medium control unit 52, and is stored in the external recording medium 54.

A flashlight 56 of the flash 1 emits light by the control from a flash control unit 58.

An image processing unit 62 is constituted by circuits to perform various image processes, and the like.

The image processing unit 62 in the example configures a trimming device for cutting out partial images corresponding to trimming regions from multiple viewpoint images composing a stereoscopic image, respectively, and thereby generating a stereoscopic partial image composed of multiple partial images that are different in viewpoint. Further, the image processing unit 62 in the example configures an image enlargement device for enlarging the size of the stereoscopic partial image.

A parallax map generation unit 64 configures a parallax information generation device for generating a parallax map (parallax information) that indicates the parallax (parallax distribution) between partial images for the multiple partial images.

A cross-point setting unit 66 configures a cross-point setting device for setting, in the stereoscopic partial image, a cross-point having no parallax. The cross-point setting unit 66 in the example has a function to set the cross-point to a point at which the average parallax for the stereoscopic partial image and the average parallax for the stereoscopic image coincide.

A parallax increasing unit 68 configures a parallax adjustment device for adjusting the parallax between partial images for the multiple partial images, based on the parallax information.

A sharpness alternation processing unit 70 configures a sharpness alternation processing device for performing an image process to alter the sharpness of the multiple partial images after the parallax adjustment, based on the parallax adjustment result by the parallax increasing unit 68. The sharpness alternation processing unit 70 in the example enhances the sharpness as the adjusted parallax amount decreases and reduces the sharpness as the adjusted parallax amount increases.

Here, the 3D digital camera 10 can acquire not only a stereoscopic image (3D image) but also a plane image (2D image).

<Trimming Example for Stereoscopic Image>

Next, a trimming example for the stereoscopic image is explained.

Figure 6:
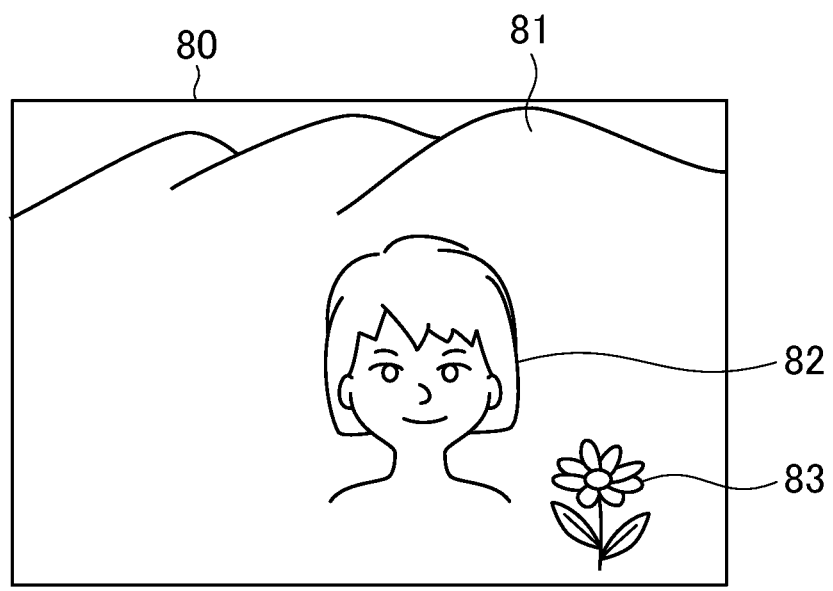
FIG. 6 is an explanatory diagram showing an example of a stereoscopic image that contains a flower image as a near view, a person image as an intermediate view, and a mountain image as a distant view.
Figure 7A:
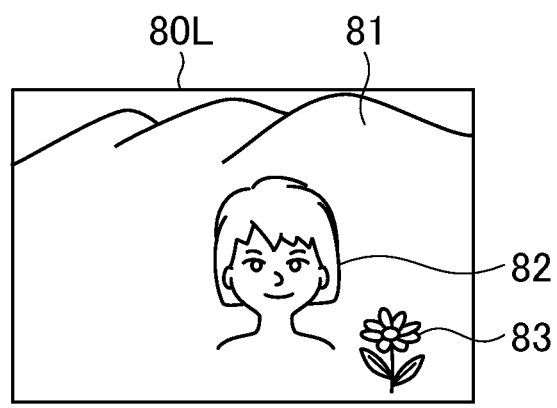
FIG. 7A is an explanatory diagram of an example of a left-eye image that composes an original stereoscopic image.
Figure 7B:
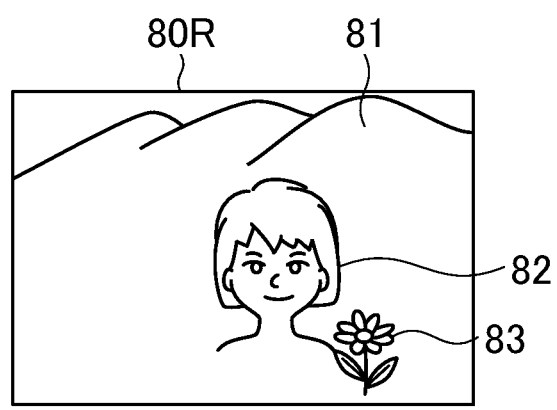
FIG. 7B is an explanatory diagram of an example of a right-eye image that composes the original stereoscopic image.

An original stereoscopic image 80 in FIG. 6 is an image picked up by the pupil-division scheme, and actually, is composed of a left-eye image 80L and a right-eye image 80R shown in FIG. 7A and FIG. 7B. The original stereoscopic image 80 in the example contains a mountain image 81 at a long distance (distant view), a person image 82 at a middle distance (intermediate view), and a flower image 83 at a short distance (near view).

For example, at least one of the left-eye image 80L and the right-eye image 80R is displayed on the monitor 30, and the operation unit 38 receives an input of an instruction that indicates a trimming region to be cut out from the original stereoscopic image 80 (the left-eye image 80L and the right-eye image 80R). In the example, an instruction input by a user is received. The instruction input may be received from another device by communications.

Figure 8:
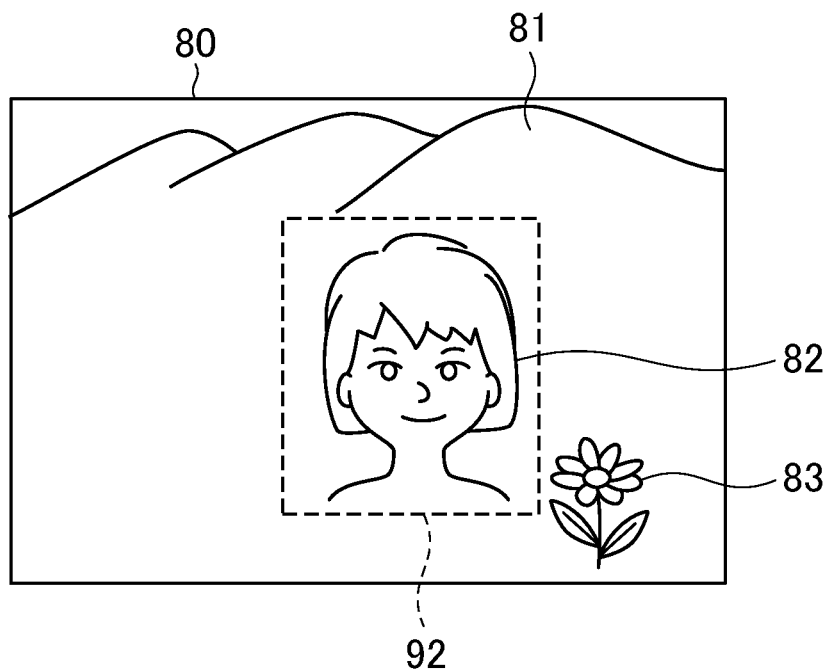
FIG. 8 is an explanatory diagram showing a case of cutting out a trimming region that contains an image at a middle distance in the original stereoscopic image.
Figure 9A:
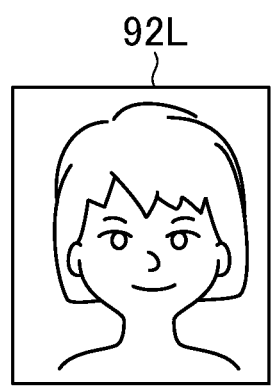
FIG. 9A is an explanatory diagram showing an example of a cut-out left-eye partial image.
Figure 9B:
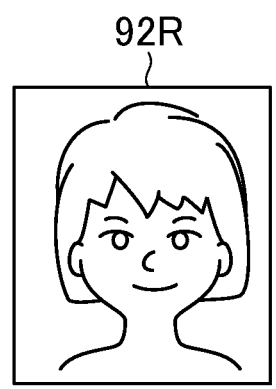
FIG. 9B is an explanatory diagram showing an example of a cut-out right-eye partial image.
Figure 10:
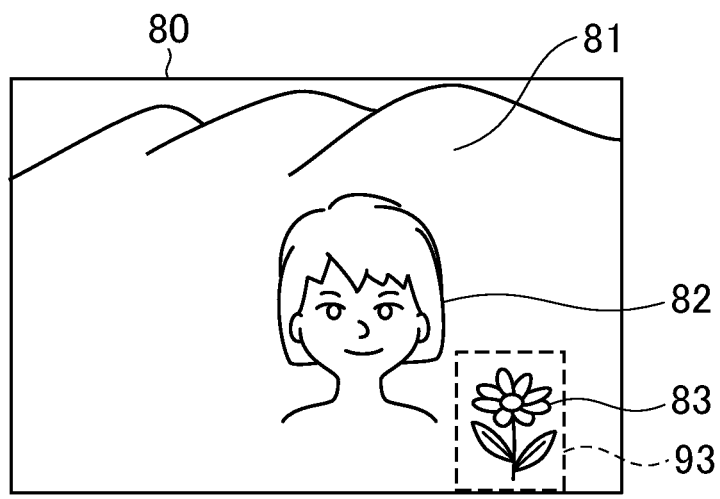
FIG. 10 is an explanatory diagram showing a case of cutting out a trimming region that contains an image at a short distance in the original stereoscopic image.
Figure 11:
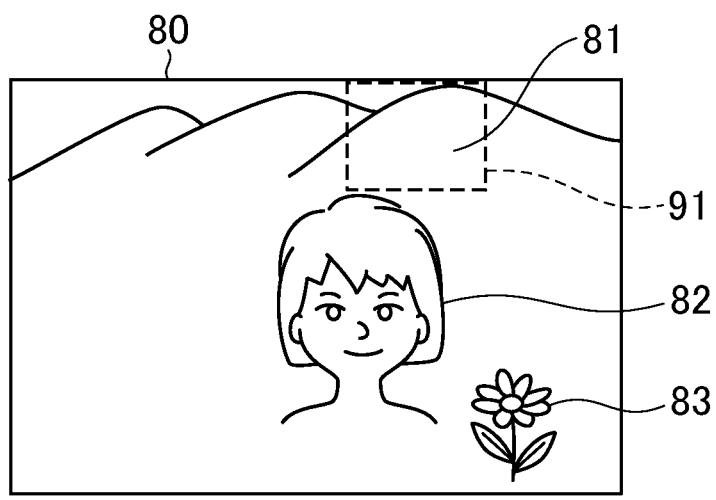
FIG. 11 is an explanatory diagram showing a case of cutting out a trimming region that contains an image at a long distance in the original stereoscopic image.
Figure 12:
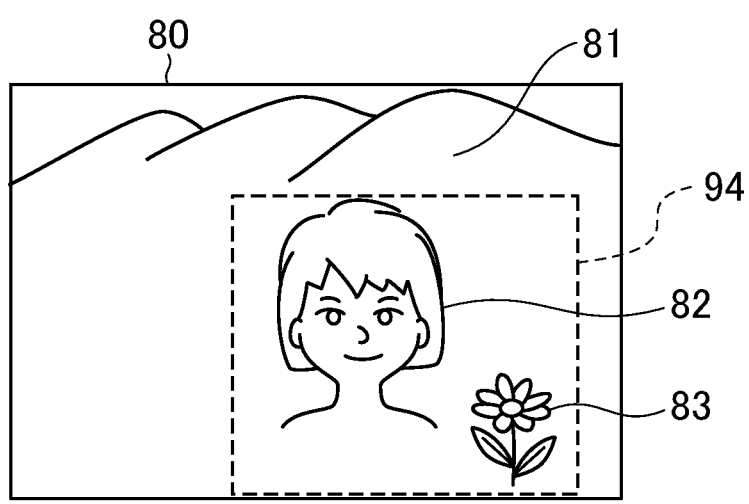
FIG. 12 is an explanatory diagram showing a case of cutting out a trimming region that contains the images at the middle distance and short distance in the original stereoscopic image.

FIG. 8 shows a case of cutting out a stereoscopic partial image in a trimming region 92 that contains the person image 82 at the middle distance, from the original stereoscopic image 80. Actually, a left-eye partial image 92L and a right-eye partial image 92R shown in FIG. 9A and FIG. 9B are cut out from the left-eye image 80L and the right-eye image 80R in FIG. 7A and FIG. 7B, respectively. FIG. 10 shows a case of cutting out a stereoscopic partial image in a trimming region 93 that contains the flower image 83 at the short distance, from the original stereoscopic image 80. FIG. 11 shows a case of cutting out a stereoscopic partial image in a trimming region 91 that contains the mountain image 81 at the long distance, from the original stereoscopic image 80. FIG. 12 shows a case of cutting out a trimming region 94 that contains the person image 82 at the middle distance and the flower image 83 at the short distance in the original stereoscopic image 80. In each case, a left-eye partial image and a right-eye partial image are cut out from the left-eye image 80L and the right-eye image 80R in FIG. 7A and FIG. 7B, respectively.

<An Example of Image Processing Method>

Figure 13:
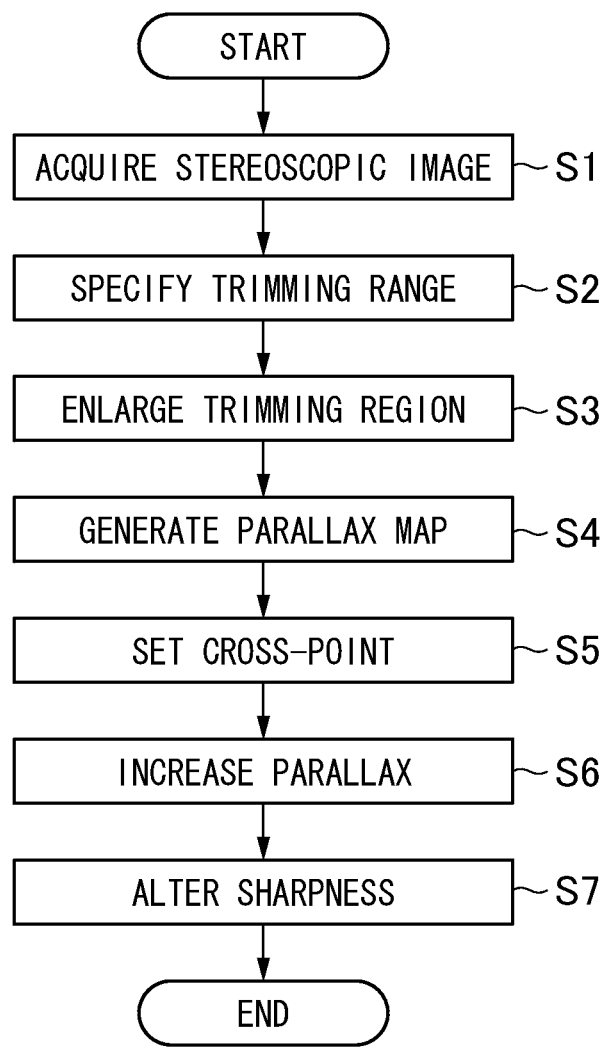
FIG. 13 is a flowchart showing the flow of an exemplary process of an image processing method according to the present invention.

FIG. 13 is a flowchart showing the flow of an exemplary process of an image processing method according to the present invention. The process is executed by the CPU 40 in FIG. 5, in accordance with a program.

In FIG. 13, a stereoscopic image acquisition (step S1), a trimming range specification (step S2), a trimming region enlargement (step S3), a parallax map generation (step S4), a cross-point setting (step S5), a parallax increasing (step S6) and a sharpness alternation process (step S7) are executed in this order. The present invention includes a case of performing them in other orders, also.

First, the medium control unit 52 acquires the original stereoscopic image (reference numeral 80 in FIG. 6) composed of the multiple viewpoint images (the left-eye image 80L and the right-eye image 80R in FIG. 7A and FIG. 7B) that are generated by the pupil-division-scheme imaging and that are different in viewpoint (step S1).

Next, the operation unit 38 (the instruction input device) receives an input of an instruction of a trimming range specification that indicates a trimming region to be cut out from the original stereoscopic image 80 (step S2). For example, as shown in FIG. 8, in the case of cutting out the partial images 92L, 92R from the trimming region 92 that contains the person image in the intermediate view, an instruction input to specify the range of the trimming region 92 shown by the dotted line is received.

Next, the image processing unit 62 (the image enlargement device) cuts out the partial images 92L, 92R in the trimming region 92, from the left-eye image 80L and the right-eye image 80R in the original stereoscopic image 80, respectively, and enlarges the cut-out partial images 92L, 92R in the trimming region 92 (step S3). That is, the left-eye partial image 92L and the right-eye partial image 92R are enlarged by the image process, respectively.

Next, the parallax map generation unit 64 (the parallax information generation device) generates a parallax map for the enlarged partial images 92L, 92R in the trimming region (step S4). The parallax map in the example indicates the parallax between corresponding points of the left-eye partial image and the right-eye partial image.

Next, the cross-point setting unit 66 sets a cross-point having no parallax, in the partial images (the images in the trimming region) (step S5), and the parallax increasing unit 68 increases (adjusts) the parallax for the partial images, based on the parallax map for the partial images (step S6). The setting of the parallax increasing amount may be performed on the basis of the displayable width of the display system.

For example, as shown in FIG. 8, in the case of performing the trimming from the original stereoscopic image 80 centering on the person image 82 at the middle distance, the cross-point is set in the person image 82, and if this goes on, the parallax amount is small. Therefore, the parallax amount is increased in the whole of the partial images 92L, 92R. Further, for example, as shown in FIG. 10, in the case of performing the trimming from the original stereoscopic image 80 centering on the flower image 83 at the short distance, the cross-point is set in the flower image 83, and if this goes on, the parallax amount is small. Therefore, the parallax amount is increased in the whole of the partial image 93. Further, for example, as shown in FIG. 11, in the case of performing the trimming from the original stereoscopic image 80 centering on the mountain image 81 at the long distance, the cross-point is set in the mountain image 81, and if this goes on, the parallax amount is small. Therefore, the parallax is increased in the whole of the partial image 91.

Next, the sharpness alternation processing unit 70 alters the sharpness of the stereoscopic partial image in which the parallax has been increased (step S6). Based on the parallax map (parallax information) after the parallax increasing (parallax adjustment) in step S6, the sharpness alternation processing unit 70 in the example performs the image process to enhance the sharpness as the adjusted parallax amount decreases and to reduce the sharpness as the adjusted parallax amount increases, for the multiple partial images after the parallax increasing (parallax adjustment).

Here, the case where the cross-point setting (step S5) and the parallax increasing (step S6) are performed in this order has been explained, but they may be performed in an order of the parallax increasing (step S6) and the cross-point setting (step S5). The order of the cross-point setting and the parallax increasing makes the maximum shift amount of the parallax be smaller, resulting in a memory saving.

<Cross-Point Setting and Parallax Increasing>

Examples of the cross-point setting (step S5) by the cross-point setting unit 66 and the parallax increasing (step S6) by the parallax increasing unit 68 are explained using FIG. 14 to FIG. 17.

Figure 14:
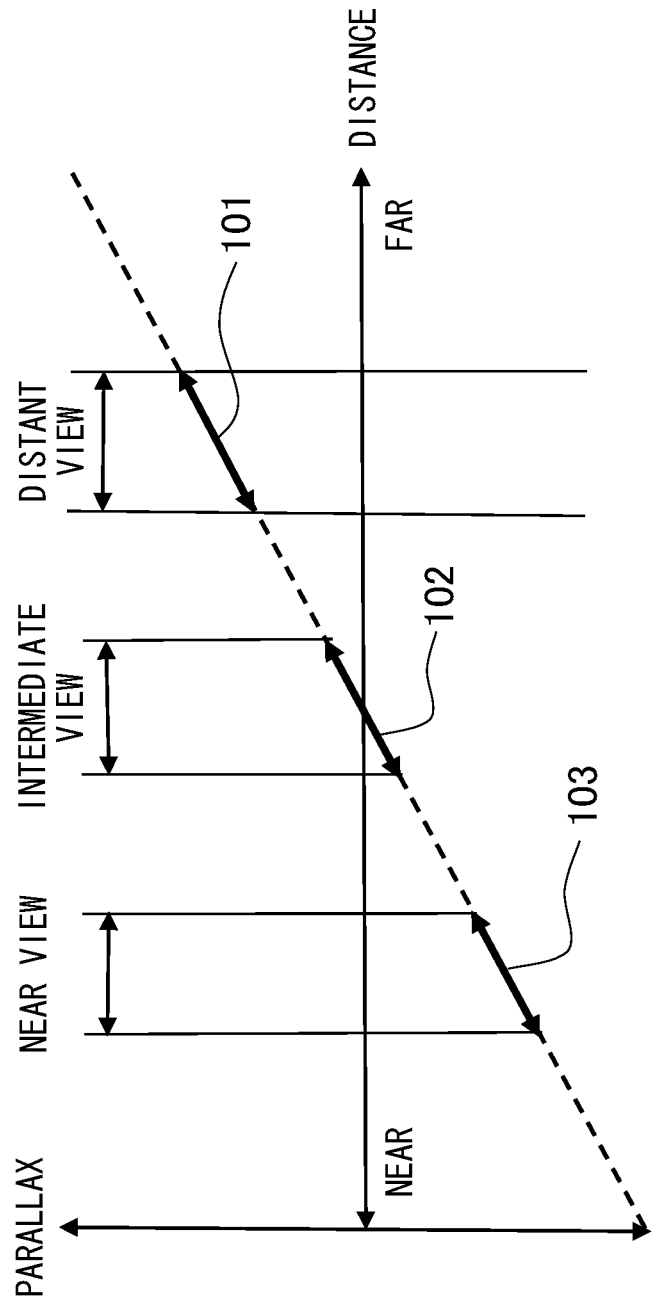
FIG. 14 is an explanatory diagram showing a relationship between the distance and the parallax in the original stereoscopic image.

FIG. 14 shows a relationship between the distance (the distance from the 3D digital camera 10 to a subject) and the parallax in the original stereoscopic image 80. Reference numeral 101 designates the distance and the parallax range for the mountain image 81 as a distant view, reference numeral 102 designates the distance and the parallax range for the person image 82 as an intermediate view, and reference numeral 103 designates the distance and the parallax range for the flower image 83 as a distant view.

Figure 15:
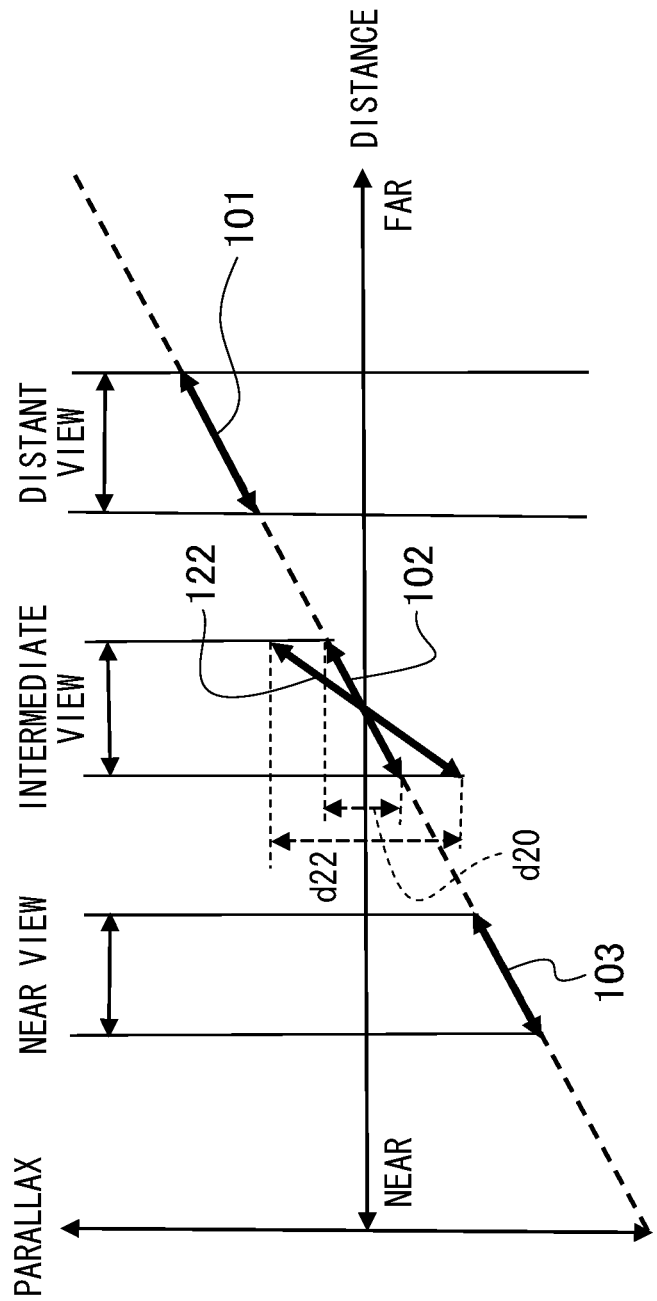
FIG. 15 is an explanatory diagram of the cross-point setting and the parallax increasing in the case of cutting out the partial images from the trimming region in the intermediate view.

In the case of cutting out the stereoscopic partial image from the trimming region 92 that contains the person image 82 in the intermediate view as shown in FIG. 8, the cross-point setting and the parallax increasing are performed as shown in FIG. 15. In the example, the parallax increasing unit 68 changes the correspondence relationship between the parallax and the distance, from the straight line designated by reference numeral 102 to the straight line designated by reference numeral 122. Thereby, the parallax range is increased from d20 to d22 (>d20).

Figure 16:
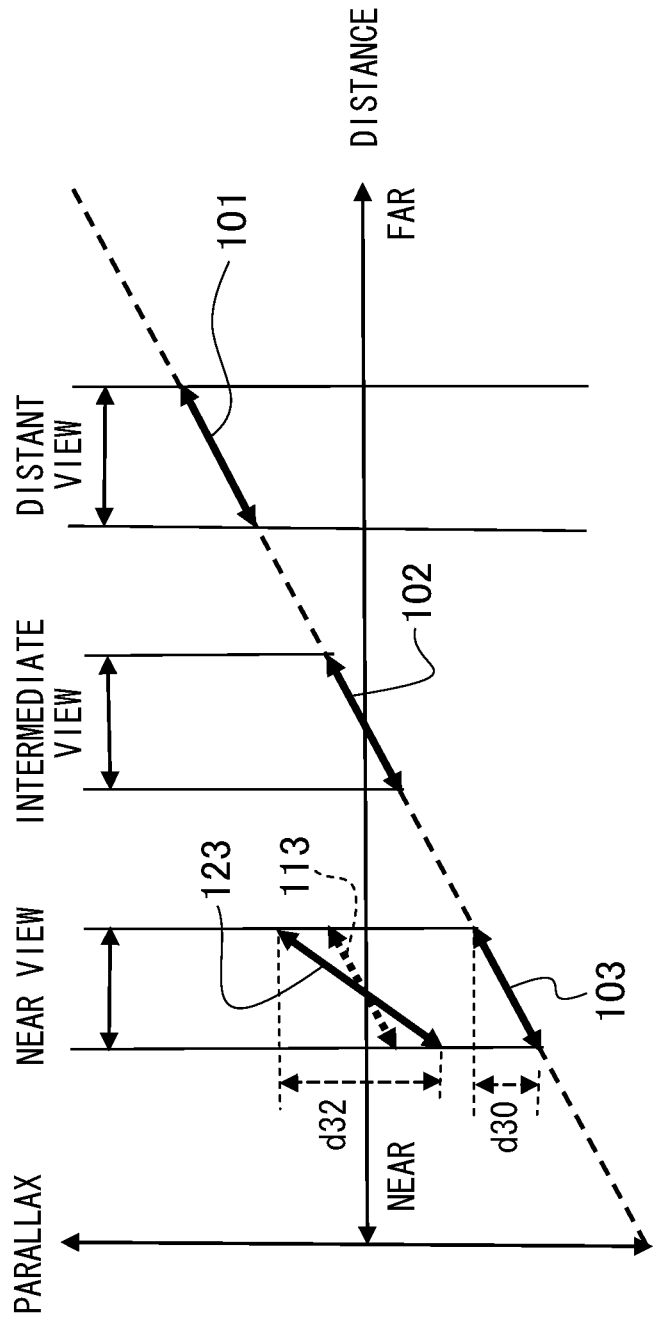
FIG. 16 is an explanatory diagram of the cross-point setting and the parallax increasing in the case of cutting out the partial images from the trimming region in the near view.

In the case of cutting out the partial images from the trimming region 93 that contains the flower image 83 in the near view as shown in FIG. 10, the cross-point setting and the parallax increasing are performed as shown in FIG. 16. In the example, first, the cross-point setting unit 66 changes the correspondence relationship between the parallax and the distance, from the straight line designated by reference numeral 103 to the straight line (dotted line) designated by reference numeral 113. Here, the cross-point setting unit 66 sets the cross-point such that the average parallax for the stereoscopic partial image and the average parallax for the original stereoscopic image coincide. Next, the parallax increasing unit 68 changes the correspondence between the parallax and the distance, from the straight line designated by reference numeral 113 to the straight line designated by reference numeral 123. Thereby, the parallax range is increased from d30 to d32 (>d30).

Figure 17:
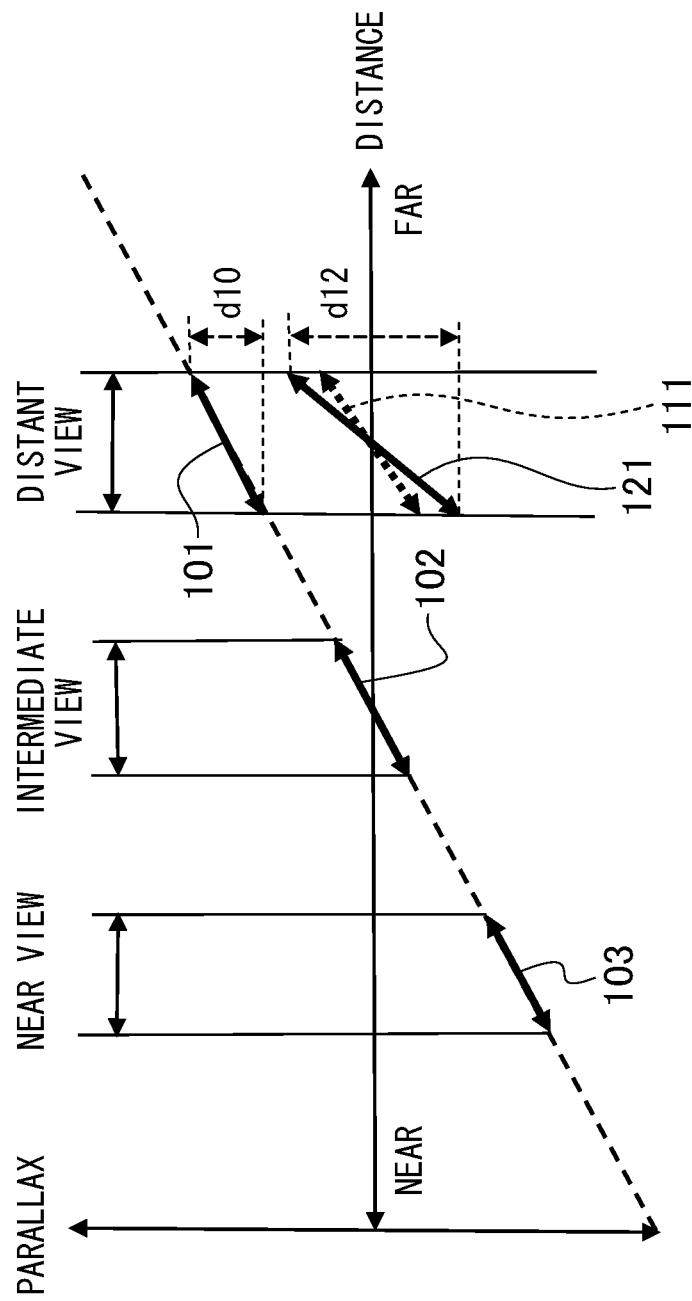
FIG. 17 is an explanatory diagram of the cross-point setting and the parallax increasing in the case of cutting out the partial images from the trimming region in the distant view.

In the case of cutting out the partial images from the trimming region 91 that contains the mountain image 81 in the distant view as shown in FIG. 11, the cross-point setting and the parallax increasing are performed as shown in FIG. 17. In the example, first, the cross-point setting unit 66 changes the correspondence relationship between the parallax and the distance, from the straight line designated by reference numeral 101 to the straight line (dotted line) designated by reference numeral 111. Here, the cross-point setting unit 66 sets the cross-point such that the average parallax for the stereoscopic partial image and the average parallax for the original stereoscopic image coincide. Next, the parallax increasing unit 68 changes the correspondence between the parallax and the distance, from the straight line designated by reference numeral 111 to the straight line designated by reference numeral 121. Thereby, the parallax range is increased from d10 to d12 (>d10).

As the parallax increasing process by the parallax increasing unit 68, for example, an image process to segment the stereoscopic partial image into a short-distance region and a long-distance region, based on the parallax map (parallax information) between the partial images that are different in viewpoint, and to make the parallax increasing rate for the short-distance region greater than the parallax increasing rate for the long-distance region, may be performed.

Further, when the image processing unit 62 (the image enlargement device) enlarges the size of the stereoscopic partial image, the parallax increasing unit 68 subtracts the incremental parallax amount associated with the enlargement of the size of the stereoscopic partial image by the image processing unit 62, to increase the parallax for the stereoscopic partial image.

Further, the cross-point setting unit 66 in the example sets the cross-point to a point at which the average parallax for the stereoscopic partial image and the average parallax for the stereoscopic image coincide.

<Sharpness Alternation Process>

As the sharpness alternation process by the sharpness alternation processing unit 70, there are various manners.

Firstly, there is a manner of enhancing the sharpness for, in the stereoscopic partial image, a part in which the adjusted parallax amount is small, and reducing the sharpness for a part in which the adjusted parallax amount is large, based on the parallax map (the parallax information) after the parallax adjustment (for example, after the parallax increasing), which indicates the parallax (the parallax distribution) between the left-eye partial image and right-eye partial image of the stereoscopic partial image.

For example, the sharpness alternation processing unit 70 segments the stereoscopic partial image into a small-parallax region (a first region) in which the parallax amount (the magnitude of the parallax) is a threshold value or less and a large-parallax region (a second region) in which the parallax amount is larger than the threshold value, based on the parallax map, and then, performs an image process to enhance the sharpness in the small-parallax region (the first region) and performs an image process to blur the large-parallax region (the second region). For example, the cross-point and the near region thereof are sharpened, and the region that is distant from the cross-point and that has a large parallax amount is blurred.

Secondly, there is a manner of altering the sharpness of the stereoscopic partial image based on the parallax map after the parallax adjustment, using a blur function expressing a blur state of the multiple viewpoint images that is caused by the pupil-division-scheme imaging. For example, a blur function corresponding to the parallax map before the parallax adjustment is correlated to the parallax map after the parallax adjustment, and based on the parallax map after the parallax adjustment, a restoration process is performed as the sharpness alternation process.

The restoration process is performed, for example, using a blur function of a lens, a blur function of a point light source or the like, as the blur function.

Thirdly, there is a manner of altering the sharpness of the whole of the stereoscopic partial image by an identical sharpness alternation process, based on the parallax map after the parallax adjustment. For example, the sharpness of the whole of the stereoscopic partial image is enhanced as a representative value (for example, the maximum parallax) of the parallax amount for the stereoscopic partial image after the adjustment decreases, and the sharpness of the whole of the stereoscopic partial image is reduced as the representative value (for example, the maximum parallax) of the parallax amount for the stereoscopic partial image after the adjustment increases.

As the sharpness alternation process, a widely known technology can be used. A Wiener filter, a general inverse filter, a projection filter or the like may be applied.

<Configuration of Smart Phone>

Figure 18:
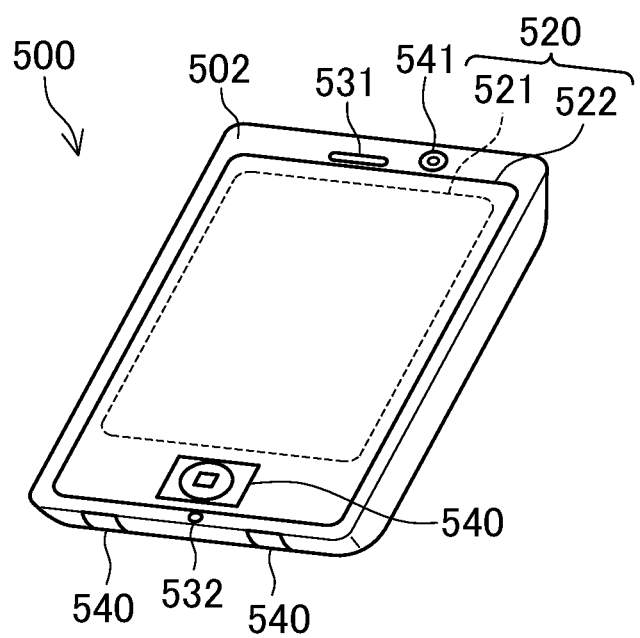
FIG. 18 is an external view of a smart phone that is another embodiment of the image processing device according to the present invention.

FIG. 18 shows an external view of a smart phone 500 that is another embodiment of the portable electronic apparatus according to the present invention. The smart phone 500 shown in FIG. 18 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 19:
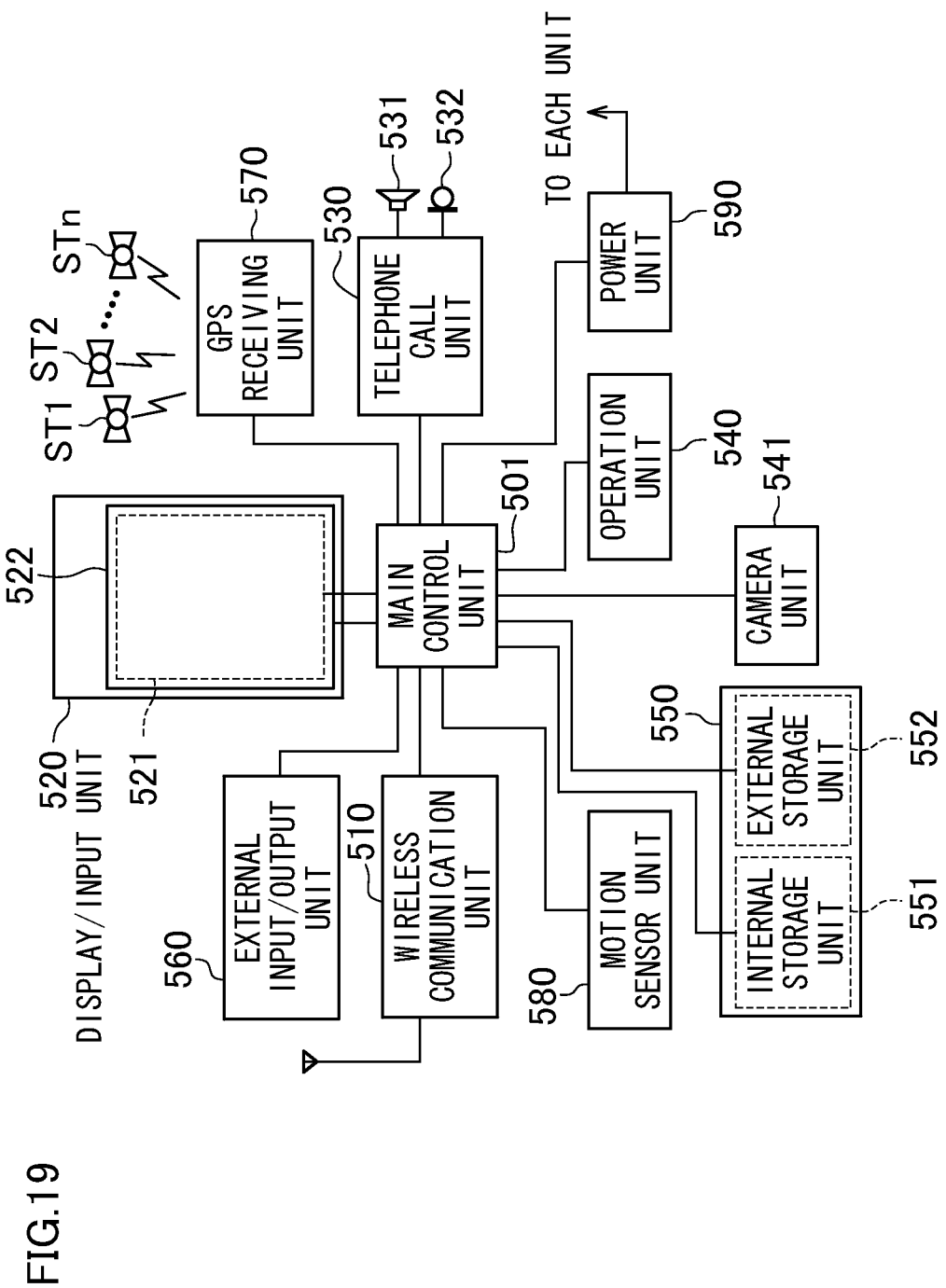
FIG. 19 is a block diagram showing the configuration of the above smart phone.

FIG. 19 is a block diagram showing the configuration of the smart phone 500 shown in FIG. 18. As shown in FIG. 19, the smart phone includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501, as the main constituent elements. Further, the smart phone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called operation panel that, by the control from the main control unit 501, displays an image (a still image and a moving image), character information or the like to visually transmit the information to a user, and therewith, detects the user operation to the displayed information, and includes the display panel 521 and the operation panel 522.

The display panel 521 is an LCD (Liquid Crystal Display), an OELD (Organic Electro-Luminescence Display) or the like that is used as a display device. The operation panel 522 is a device that is placed such that an image to be displayed on the display surface of the display panel 521 can be visually recognized and that detects a single or multiple coordinates to be operated by a finger of a user or a stylus. When this device is operated by a finger of a user or a stylus, a detection signal generated due to the operation is output to the main control unit 501. Next, the main control unit 501 detects the operation position (coordinate) on the display panel 521, based on the received detection signal.

As shown in FIG. 18, the display panel 521 and operation panel 522 of the smart phone 500 are unified to constitute the display/input unit 520, and are arranged such that the operation panel 522 completely covers the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530, which includes the speaker 531 and the microphone 532, converts a user voice input through the microphone 532 into audio data capable of being processed in the main control unit 501, to output it to the main control unit 501, and decodes audio data received by the wireless communication unit 510 or the external input/output unit 560, to output it from the speaker 531. Further, as shown in FIG. 18, for example, the speaker 531 can be mounted on the same surface as the surface on which the display/input unit 520 is provided, and the microphone 532 can be mounted on the side surface of the case 502.

The operation unit 540 is a hardware key using a key switch or the like, and receives an instruction from a user. For example, as shown in FIG. 18, the operation unit 540, which is mounted on the lower surface below the display unit of the case 502 of the smart phone 500, is a push-button switch that is turned on when being pushed by a finger or the like and becomes the off state by the restring force of a spring or the like when the finger is released.

The storage unit 550 stores a control program and control data of the main control unit 501, application software, address data associated with the name, telephone number and others of a communication partner, sent or received e-mail data, Web data downloaded by Web browsing, and downloaded content data, and further, temporarily stores streaming data or the like. Further, the storage unit 550 is constituted by an internal storage unit 551 built in the smart phone, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD (R) memory or the like), a RAM (Random Access Memory), or a ROM (Read Only Memory).

The external input/output unit 560 plays a role as an interface to all external apparatuses that is linked with the smart phone 500, and is directly or indirectly connected with another external apparatus, through a communication (for example, the universal serial bus (USB), IEEE1394 or the like), or a network (for example, the internet, a wireless LAN, Bluetooth (R), RFID (Radio Frequency Identification), the infrared communication (Infrared Data Association: IrDA) (R), UWB (Ultra Wideband) (R), ZigBee (R), or the like).

Examples of the external apparatus to be linked with the smart phone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wirelessly, a personal computer to be connected by wire or wirelessly, a PDA (portable information communication terminal) to be connected by wire or wirelessly, a personal computer to be connected by wire or wirelessly, an earphone, and the like. The external input/output unit allows data transferred from such an external apparatus to be transmitted to each constituent element in the interior of the smart phone 500, and allows data in the interior of the smart phone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smart phone 500 by the latitude, longitude and altitude. When the position information can be acquired from the wireless communication unit 510 or the external input/output unit 560 (for example, a wireless LAN), the GPS receiving unit 570 can detect the position using the position information.

The motion sensor unit 580 includes, for example, a three-axis acceleration sensor and the like, and detects the physical motion of the smart phone 500 in accordance with an instruction of the main control unit 501. The detection of the physical motion of the smart phone 500 leads to the detection of the moving direction and acceleration of the smart phone 500. This detection result is output to the main control unit 501.

The power unit 590 supplies the electric power stored in a battery (not shown in the figure), to each unit of the smart phone 500, in accordance with an instruction of the main control unit 501.

The main control unit 501, which includes a microprocessor, operates in accordance with the control program and control data stored in the storage unit 550, and integrally controls each unit of the smart phone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 20.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 21, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation device not a conventional simple touch operation, but an operation to draw a track from at least one of multiple positions by drawing the track by a finger or the like, by designating multiple positions simultaneously, or by combining them.

The camera unit 541 is a digital camera that performs an electronic image-taking using an imaging element such as a CMOS (Complementary Metal Oxide Semiconductor) or a CCD (Charge-Coupled Device). Further, by the control of the main control unit 501, the camera unit 541 can convert image data obtained by the imaging, into compressed image data such as JPEG (joint Photographic coding Experts Group), for example, and can record them in the storage unit 550, or output them through the input/output unit 560 or the wireless communication unit 510. In the smart phone 500 shown in FIG. 18, the camera unit 541 is mounted on the same surface as the display/input unit 520. However, the mount position of the camera unit 541 is not limited to this, and it may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smart phone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smart phone 500, and to decide the current usage environment without using a three-axis acceleration sensor or using a three-axis acceleration sensor together. Naturally, it is possible to utilize an image from the camera unit 541 within the application software.

The main control unit 501 has functions as the image processing unit 62, the parallax map generation unit 64, the cross-point setting unit 66, the parallax increasing unit 68, the sharpness alternation processing unit 70, the CPU 40 and the like in FIG. 5, described above.

In addition, it is possible to add the position information acquired by the GPS receiving unit 570, the voice information acquired by the microphone 532 (it may be the text information after the voice-text conversion by the main control unit or the like), the attitude information acquired by the motion sensor unit 580, or the like, to image data of still image or moving image, to store them in the storage unit 550, and to output them through the input/output unit 560 or the wireless communication unit 510.

The present invention can be provided as a computer-readable program code for making the above-exemplified devices perform the above processes, a non-transitory and computer-readable recording medium (for example, an optical disk (for example, a CD (Compact Disk), a DVD (Digital versatile Disk) or a BD (Blu-ray Disk)), or a magnetic disk (for example, a hard disk or a magneto-optical disk)) in which the program code is stored, or a computer program product in which an executable code for the method is stored.

Here, the present invention is not limited to the examples explained in the specification and the examples illustrated in the drawings. Naturally, various design alternations and improvements may be made without departing from the scope of the present invention.

What is claimed is:

1. An image processing device comprising:
an image acquisition device for acquiring a stereoscopic image including multiple viewpoint images that are generated by pupil-division-scheme imaging and that are different in viewpoint;
an instruction input device for inputting an instruction that indicates trimming regions, the trimming regions being cut out from the multiple viewpoint images of the stereoscopic image;
a trimming device for cutting out partial images corresponding to the trimming regions, from the multiple viewpoint images of the stereoscopic image, respectively, and thereby generating a stereoscopic partial image including the multiple partial images that are different in viewpoint;
a parallax information generation device for generating parallax information that indicates a parallax between partial images for the multiple partial images;
a parallax adjustment device for adjusting the parallax between partial images for the multiple partial images, based on the parallax information; and
a sharpness alternation processing device for performing an image process for the multiple partial images after the adjustment of the parallax, based on the adjustment result by the parallax adjustment device, the image process being a process to enhance sharpness as the adjusted parallax amount decreases and to reduce the sharpness as the adjusted parallax amount increases; and
a cross-point setting device for setting a cross-point having no parallax in the stereoscopic partial image to a point at which an average parallax for the stereoscopic partial image and an average parallax for the stereoscopic image coincide.

2. The image processing device according to claim 1, wherein the sharpness alternation processing device segments the stereoscopic partial image into a first region and a second region having a larger parallax amount than the first region, based on the parallax information, and then, enhances the sharpness of an image in the first region and reduces the sharpness of an image in the second region having the larger parallax amount than the first region.

3. The image processing device according to claim 1, wherein the sharpness alternation processing device alters the sharpness of the stereoscopic partial image, using a blur function that expresses a blur state of the multiple viewpoint images, the blur state being caused by the pupil-division-scheme imaging.

4. The image processing device according to claim 1, wherein the sharpness alternation processing device alters the sharpness of a whole of the stereoscopic partial image.

5. An imaging device comprising:
the image processing device according to claim 1; and
an imaging device for performing pupil-division-scheme imaging.

6. An image processing device comprising:
an image acquisition device for acquiring a stereoscopic image including multiple viewpoint images that are generated by pupil-division-scheme imaging and that are different in viewpoint;
an instruction input device for inputting an instruction that indicates trimming regions, the trimming regions being cut out from the multiple viewpoint images of the stereoscopic image;
a trimming device for cutting out partial images corresponding to the trimming regions, from the multiple viewpoint images of the stereoscopic image, respectively, and thereby generating a stereoscopic partial image including the multiple partial images that are different in viewpoint;

a parallax information generation device for generating parallax information that indicates a parallax between partial images for the multiple partial images;

a parallax adjustment device for adjusting the parallax between partial images for the multiple partial images, based on the parallax information; and a sharpness alternation processing device for performing an image process for the multiple partial images after the adjustment of the parallax, based on the adjustment result by the parallax adjustment device, the image process being a process to enhance sharpness as the adjusted parallax amount decreases and to reduce the sharpness as the adjusted parallax amount increases, wherein, when performing a process to increase the parallax between the partial images, the parallax adjustment device detects, within the stereoscopic partial image, a region at a shorter distance than a cross-point having no parallax and a region at a longer distance than the cross-point, based on the parallax information, and makes a parallax increasing rate for the region at the shorter distance greater than a parallax increasing rate for the region at the longer distance.

7. The image processing device according to claim 6, wherein the sharpness alternation processing device segments the stereoscopic partial image into a first region and a second region having a larger parallax amount than the first region, based on the parallax information, and then, enhances the sharpness of an image in the first region and reduces the sharpness of an image in the second region having the larger parallax amount than the first region.

8. The image processing device according to claim 6, wherein the sharpness alternation processing device alters the sharpness of the stereoscopic partial image, using a blur function that expresses a blur state of the multiple viewpoint images, the blur state being caused by the pupil-division-scheme imaging.

9. The image processing device according to claim 6, wherein the sharpness alternation processing device alters the sharpness of a whole of the stereoscopic partial image.

10. An imaging device comprising:
the image processing device according to claim 6; and
an imaging device for performing pupil-division-scheme imaging.

11. An image processing device comprising:
an image acquisition device for acquiring a stereoscopic image including multiple viewpoint images that are generated by pupil-division-scheme imaging and that are different in viewpoint;
an instruction input device for inputting an instruction that indicates trimming regions, the trimming regions being cut out from the multiple viewpoint images of the stereoscopic image;
a trimming device for cutting out partial images corresponding to the trimming regions, from the multiple viewpoint images of the stereoscopic image, respectively, and thereby generating a stereoscopic partial image including the multiple partial images that are different in viewpoint;
a parallax information generation device for generating parallax information that indicates a parallax between partial images for the multiple partial images;
a parallax adjustment device for adjusting the parallax between partial images for the multiple partial images, based on the parallax information; and
a sharpness alternation processing device for performing an image process for the multiple partial images after the adjustment of the parallax, based on the adjustment result by the parallax adjustment device, the image process being a process to enhance sharpness as the adjusted parallax amount decreases and to reduce the sharpness as the adjusted parallax amount increases; and
an image enlargement device for enlarging a size of the stereoscopic partial image,
wherein, when performing a process to increase the parallax between the partial images, the parallax adjustment device subtracts an incremental parallax amount associated with the enlargement of the size of the stereoscopic partial image by the image enlargement device, to determine an increasing rate of the parallax for the stereoscopic partial image.

12. The image processing device according to claim 11, wherein the sharpness alternation processing device segments the stereoscopic partial image into a first region and a second region having a larger parallax amount than the first region, based on the parallax information, and then, enhances the sharpness of an image in the first region and reduces the sharpness of an image in the second region having the larger parallax amount than the first region.

13. The image processing device according to claim 11, wherein the sharpness alternation processing device alters the sharpness of the stereoscopic partial image, using a blur function that expresses a blur state of the multiple viewpoint images, the blur state being caused by the pupil-division-scheme imaging.

14. The image processing device according to claim 11, wherein the sharpness alternation processing device alters the sharpness of a whole of the stereoscopic partial image.

15. An imaging device comprising:
the image processing device according to claim 11; and
an imaging device for performing pupil-division-scheme imaging.

16. An image processing method comprising:
a step of acquiring a stereoscopic image including multiple viewpoint images that are generated by pupil-division-scheme imaging and that are different in viewpoint;
a step of inputting an instruction that indicates trimming regions, the trimming regions being cut out from the multiple viewpoint images of the stereoscopic image;
a step of cutting out partial images corresponding to the trimming regions, from the multiple viewpoint images of the stereoscopic image, respectively, and thereby generating a stereoscopic partial image including the multiple partial images that are different in viewpoint;
a step of generating parallax information that indicates a parallax between partial images for the multiple partial images;
a step of adjusting the parallax between partial images for the multiple partial images, based on the parallax information;
a step of performing an image process for the multiple partial images after the adjustment of the parallax, based on the adjustment result of the parallax, the image process being a process to enhance sharpness as the adjusted parallax amount decreases and to reduce the sharpness as the adjusted parallax amount increases; and a step of setting a cross-point having no parallax in the stereoscopic partial image to a point at which an average parallax for the stereoscopic partial image and an average parallax for the stereoscopic image coincide.

17. A non-transitory computer-readable recording medium storing a program causing a processor to execute the image processing method according to claim 16.

\* \* \* \* \*